United States Patent
Segall et al.

(10) Patent No.: US 12,089,614 B2
(45) Date of Patent: Sep. 17, 2024

(54) PRODUCTION OF SOY PROTEIN PRODUCT USING CALCIUM CHLORIDE EXTRACTION ("S702/S7300/S7200/S7301")

(75) Inventors: Kevin I. Segall, Winnipeg (CA); Martin Schweizer, Winnipeg (CA); Brent E. Green, Winnipeg (CA); Sarah Medina, Winnipeg (CA); Brandy Gosnell, Winnipeg (CA)

(73) Assignee: Burcon NutraScience (MB) Corp., Winnipeg (CA)

( * ) Notice: Subject to any disclaimer, the term of this patent is extended or adjusted under 35 U.S.C. 154(b) by 189 days.

(21) Appl. No.: 13/138,395

(22) PCT Filed: Feb. 11, 2010

(86) PCT No.: PCT/CA2010/000189
§ 371 (c)(1),
(2), (4) Date: Oct. 20, 2011

(87) PCT Pub. No.: WO2010/091509
PCT Pub. Date: Aug. 19, 2010

(65) Prior Publication Data
US 2012/0040074 A1 Feb. 16, 2012

Related U.S. Application Data

(60) Provisional application No. 61/213,663, filed on Jun. 30, 2009, provisional application No. 61/202,262, filed on Feb. 11, 2009.

(51) Int. Cl.
| | | |
|---|---|---|
| A23L 2/00 | (2006.01) | |
| A23J 1/14 | (2006.01) | |
| A23J 3/16 | (2006.01) | |
| A23L 2/39 | (2006.01) | |
| A23L 2/66 | (2006.01) | |
| A23L 33/185 | (2016.01) | |

(52) U.S. Cl.
CPC . *A23J 1/14* (2013.01); *A23J 3/16* (2013.01); *A23L 2/39* (2013.01); *A23L 2/66* (2013.01); *A23L 33/185* (2016.08); *A23V 2002/00* (2013.01)

(58) Field of Classification Search
CPC ... A23J 1/14; A23J 3/16; A23L 33/185; A23L 2/39; A23L 2/66; A23V 2002/00
See application file for complete search history.

(56) References Cited

U.S. PATENT DOCUMENTS

| | | | |
|---|---|---|---|
| 3,853,839 A * | 12/1974 | Magnino | A23J 3/16 530/378 |
| 4,169,090 A | 9/1979 | Murray et al. | |
| 4,208,323 A | 6/1980 | Murray et al. | |
| 4,296,026 A | 10/1981 | Millar | |
| 4,420,425 A | 12/1983 | Lawhon | |
| 5,844,086 A | 12/1998 | Murray | |
| 6,005,076 A | 12/1999 | Murray | |
| 7,465,470 B2 | 12/2008 | Saito et al. | |
| 8,404,299 B2 * | 3/2013 | Segall | A23L 33/185 426/656 |
| 8,501,265 B2 * | 8/2013 | Segall | A23L 2/66 426/634 |
| 8,557,321 B2 * | 10/2013 | Segall | A23L 2/66 426/598 |
| 8,691,318 B2 * | 4/2014 | Schweizer | A23L 2/66 426/634 |
| 8,936,824 B2 * | 1/2015 | Schweizer | A23L 2/66 426/656 |
| 9,456,621 B2 * | 10/2016 | Green | A23J 1/14 |
| 9,603,377 B2 * | 3/2017 | Segall | A23J 3/16 |
| 9,629,381 B2 * | 4/2017 | Schweizer | A23L 2/66 |
| 9,700,066 B2 * | 7/2017 | Segall | A23L 33/185 |
| 10,575,538 B2 * | 3/2020 | Schweizer | A23J 1/14 |
| 2002/0146487 A1 * | 10/2002 | Tsukuda | A23L 29/35 426/89 |
| 2003/0013852 A1 * | 1/2003 | Sakata | A23J 3/16 530/372 |
| 2004/0086624 A1 * | 5/2004 | Saito | A23L 11/05 426/629 |
| 2005/0255226 A1 | 11/2005 | Schweizer et al. | |
| 2007/0014896 A1 * | 1/2007 | Wong | A23J 3/16 426/74 |
| 2007/0148321 A1 * | 6/2007 | Ashida | A23G 9/38 426/634 |
| 2009/0005544 A1 * | 1/2009 | Ndife | A23J 3/16 530/418 |
| 2009/0081351 A1 * | 3/2009 | Mellema | A23L 2/52 426/598 |

FOREIGN PATENT DOCUMENTS

| | | |
|---|---|---|
| CA | 2564400 | 11/2005 |
| EP | 1323352 | 9/2000 |

(Continued)

OTHER PUBLICATIONS

Anderson, Robert L. et al., Extraction of Soybean Meal Proteins with Salt Solutions at pH4.5" J. Agric Food Chem., vol. 21, No. 2, 1973, pp. 251-254.

*Primary Examiner* — Anthony J Weier
(74) *Attorney, Agent, or Firm* — Marks & Clerk

(57) ABSTRACT

A soy protein product having a protein content of at least about 60 wt % (N×6.25) d.b., is prepared from a soy protein source material by extraction of the soy protein source material with an aqueous calcium salt solution to cause solubilization of soy protein from the protein source and to form an aqueous soy protein solution, separating the aqueous soy protein solution from residual soy protein source, concentrating the aqueous soy protein solution while maintaining the ionic strength substantially constant by using a selective membrane technique, optionally diafiltering the concentrated soy protein solution, and drying the concentrated and optionally diafiltered soy protein solution.

11 Claims, No Drawings

(56) References Cited

FOREIGN PATENT DOCUMENTS

| WO | WO 02/089597 | 11/2002 |
| WO | WO 2005/107492 | 11/2005 |
| WO | WO 2010/045727 | 4/2010 |

\* cited by examiner

PRODUCTION OF SOY PROTEIN PRODUCT USING CALCIUM CHLORIDE EXTRACTION ("S702/S7300/S7200/S7301")

REFERENCE TO RELATED APPLICATIONS

This application is a U.S. National Phase filing under 35 USC 371 of International Application No. PCT/CA2010/000189 filed Feb. 11, 2010, which in time, claims priority under 35 USC 119(e) from U.S. Provisional Patent Applications Nos. 61/202,262 and 61/213,663 filed Feb. 11, 2009 and Jun. 30, 2009 respectively.

FIELD OF INVENTION

The present invention is concerned with the preparation of soybean protein products.

BACKGROUND TO THE INVENTION

In U.S. Provisional Patent Applications Nos. 61/107,112 filed Oct. 21, 2008, 61/193,457 filed Dec. 2, 2008, 61/202,070 filed Jan. 26, 2009, 61/202,553 filed Mar. 12, 2009, 61/213,717 filed Jul. 7, 2009, 61/272,241 filed Sep. 3, 2009, and U.S. patent application Ser. No. 12/603,087 filed Oct. 21, 2009 the disclosures of which are incorporated herein by reference, there is described the preparation of a soy protein product, preferably a soy protein isolate, which is completely soluble and is capable of providing transparent and heat stable solutions at low pH values. This soy protein product may be used for protein fortification of, in particular, soft drinks and sports drinks, as well as other acidic aqueous systems, without precipitation of protein. The soy protein product is produced by extracting a soy protein source with aqueous calcium chloride solution at natural pH, optionally diluting the resulting aqueous soy protein solution, adjusting the pH of the aqueous soy protein solution to a pH of about 1.5 to about 4.4, preferably about 2.0 to about 4.0, to produce an acidified clear soy protein solution, which may be optionally concentrated and/or diafiltered before drying.

SUMMARY OF THE INVENTION

It has now been found that calcium chloride extracts of soy protein source may be processed by alternative procedures to provide substantially equivalent soy protein products, having a protein content of at least about 60 wt % (N×6.25) d.b., that are soluble in acidic media and produce transparent, heat stable solutions at low pH values, and, therefore may be used for protein fortification of, in particular, soft drinks and sports drinks, as well as other aqueous systems, without precipitation of protein. The soy protein product is preferably an isolate having a protein content of at least about 90 wt %, preferably at least about 100% (N×6.25) d.b.

In one aspect of the present invention, a soy protein source material is extracted with aqueous calcium chloride solution at natural pH and the resulting aqueous soy protein solution is subjected to ultrafiltration and optional diafiltration to provide a concentrated and optionally diafiltered soy protein solution, which may be dried to provide the soy protein product. The level of anti-nutritional trypsin inhibitors in the soy protein product may be controlled by choosing the membrane processing conditions so as to release the desired amount of inhibitors in the permeate stream.

In another aspect of the present invention, a soy protein source material is extracted with aqueous calcium chloride solution at natural pH and the resulting aqueous soy protein solution is subjected to ultrafiltration and optional diafiltration to provide a concentrated and optionally diafiltered soy protein solution. This soy protein may be fractionated by dilution into water, yielding a precipitate rich in globulin proteins and a supernatant rich in albumin proteins. The supernatant may be processed, as described in detail below, to form soy protein products having a soy protein content of at least about 60 wt %, preferably a soy protein isolate having a protein content of at least about 90 wt %. Trypsin inhibitors, which are proteins, are found primarily in the supernatant fraction after dilution. The precipitate fraction may be further processed or dried as is to provide the soy protein product, but with a reduced level of trypsin inhibitors.

The soy protein isolate provided herein is soluble at acid pH values to provide transparent and heat stable aqueous solutions thereof. The soy protein isolate may be used for protein fortification of, in particular, soft drinks and sports drinks, without precipitation of protein.

In another aspect of the present invention, the concentrated and optionally diafiltered soy protein solution, prepared as described above is diluted into water, but all the proteins are resolubilized by adjustment of the pH to about 1.5 to about 4.4, preferably about 2.0 to about 4.0. The diluted and acidified solution may then be optionally concentrated and/or diafiltered. Reduction in the trypsin inhibitor level may be achieved by judicious choice of the membrane processing parameters or optionally employing a heat treatment step on the acidified solution.

In accordance with one aspect of the present invention, there is provided a method of producing a soy protein product having a soy protein content of at least 60 wt % (N×6.25), on a dry weight basis, which comprises:
(a) extracting a soy protein source with an aqueous calcium chloride solution to cause solubilization of soy protein from the protein source and to form an aqueous soy protein solution,
(b) separating the aqueous soy protein solution from residual soy protein source,
(c) concentrating the aqueous soy protein solution while maintaining the ionic strength substantially constant by using a selective membrane technique,
(d) optionally diafiltering the concentrated soy protein solution, and
(e) drying the concentrated soy protein solution.

The soy protein product is preferably an isolate having a protein content of at least about 90 wt %, preferably at least about 100 wt % (N×6.25) d.b.

A variation of this procedure may be adopted to produce the product with a reduced content of albumin proteins and trypsin inhibitors. In such a variation, the concentrated and optionally diafiltered soy protein solution is diluted into water to yield a precipitate with a reduced content of albumin proteins and trypsin inhibitors. The precipitate may be collected and dried to yield the product or the precipitate may be solubilized in water at low pH and then dried. Alternatively, the solution formed by resolubilizing the precipitate in water at low pH may be optionally heat treated and/or concentrated and/or diafiltered before drying.

According to another aspect of the present invention, there is described a method of producing a soy protein product having a soy protein content of at least about 60 wt % (N×6.25), dry weight basis, which comprises:

(a) extracting a soy protein source with an aqueous calcium salt solution to cause solubilization of soy protein from the protein source and to form an aqueous soy protein solution, (b) separating the aqueous soy protein solution from residual soy protein source, (c) concentrating the aqueous soy protein solution while maintaining the ionic strength substantially constant by using a selective membrane technique, (d) optionally diafiltering the concentrated soy protein solution, (e) diluting the concentrated soy protein solution into water to cause the formation of a precipitate, (f) separating the precipitate from the diluting water, termed the supernatant, and (g) drying the separated soy protein precipitate.

Another variation of this procedure may be adopted to produce the product. In such a variation, the concentrated and optionally diafiltered soy protein solution is diluted into water and the pH lowered. The resulting clear, acidified solution is optionally concentrated and/or diafiltered and/or heat treated before drying to yield the product.

According to a further aspect of the present invention, there is provided a method of producing a soy protein product having a soy protein content of at least about 60 wt % (N×6.25), dry weight basis, which comprises:

(a) extracting a soy protein source with an aqueous calcium salt solution to cause solubilization of soy protein from the protein source and to form an aqueous soy protein solution, (b) separating the aqueous soy protein solution from residual soy protein source, (c) concentrating the aqueous soy protein solution while maintaining the ionic strength substantially constant by using a selective membrane technique, (d) optionally diafiltering the concentrated soy protein solution, (e) diluting the concentrated soy protein solution into water to cause the formation of a precipitate, (f) acidifying the mixture of precipitate and diluting water to re-solubilize the protein and form a clear soy protein solution, (g) concentrating the clear acidified soy protein solution while maintaining the ionic strength substantially constant by using a selective membrane technique, (h) optionally diafiltering the concentrated clear acidified soy protein solution, and (i) drying the concentrated and optionally diafiltered clear acidified soy protein solution.

Employing the procedures of the present invention allows the option of production of the soy protein product in a natural pH form. Generation of the soy protein product without an acidification step allows easier, safer and more economical processing, since there is no need for acids and their handling. In addition, this procedure permits the beverage formulator to acidify the protein and beverage with the acidifying agent of their choice, given the differing strengths and flavour profiles of various acids.

While the present invention refers mainly to the production of soy protein isolates, it is contemplated that soy protein products of lesser purity may be provided having similar properties to the soy protein isolate. Such lesser purity products may have a protein concentration of at least about 60% by weight (N×6.25) d.b.

The novel soy protein products of the invention can be blended with powdered drinks for the formation of aqueous soft drinks or sports drinks by dissolving the same in water. Such blend may be a powdered beverage.

The soy protein products provided herein may be provided as an aqueous solution thereof having a high degree of clarity at acid pH values and which is heat stable at these pH values.

In another aspect of the present invention, there is provided an aqueous solution of the soy product provided herein which is heat stable at low pH. The aqueous solution may be a beverage, which may be a clear beverage in which the soy protein product is completely soluble and transparent or an opaque beverage in which the soy protein product does not increase the opacity.

The soy protein products produced according to the processes herein lack the characteristic beany flavour of soy protein isolates and are suitable, not only for protein fortification of acid medium, but may be used in a wide variety of conventional applications of protein isolates, including, but not limited to protein fortification of processed foods and beverages, emulsification of oils, as a body former in baked goods and foaming agent in products which entrap gases. In addition, the soy protein product may be formed into protein fibers, useful in meat analogs and may be used as an egg white substitute or extender in food products where egg white is used as a binder. The soy protein product may be used as a nutritional supplement. Other uses of the soy protein product are in pet foods, animal feed and in industrial and cosmetic applications and in personal care products.

GENERAL DESCRIPTION OF INVENTION

The initial step of the process of providing the soy protein product involves solubilizing soy protein from a soy protein source. The soy protein source may be soybeans or any soy product or by-product derived from the processing of soybeans including but not limited to soy meal, soy flakes, soy grits and soy flour. The soy protein source may be used in the full fat form, partially defatted form or fully defatted form. Where the soy protein source contains an appreciable amount of fat, an oil-removal step generally is required during the process. The soy protein recovered from the soy protein source may be the protein naturally occurring in soybean or the proteinaceous material may be a protein modified by genetic manipulation but possessing characteristic hydrophobic and polar properties of the natural protein.

Protein solubilization from the soy protein source material is effected most conveniently using food grade calcium chloride solution, although solutions of other calcium salts may be used. Where the soy protein product is intended for non-food uses, non-food-grade chemicals may be used. In addition, other alkaline earth metal salts may be also used, such as magnesium salts. Further, extraction of the soy protein from the soy protein source may also be effected using calcium salt solution in combination with another salt solution, such as sodium chloride. Additionally, extraction of the soy protein from the soy protein source may be effected using water or other salt solution, such as sodium chloride solution, with calcium salt, such as calcium chloride, subsequently being added to the aqueous soy protein solution produced in the extraction step. Precipitate formed upon addition of the calcium salt then is removed prior to subsequent processing.

As the concentration of the calcium salt solution increases, the degree of solubilization of protein from the soy protein source initially increases until a maximum value is achieved. Any subsequent increase in salt concentration does not increase the total protein solubilized. The concentration of the calcium salt solution which causes maximum protein solubilization varies depending on the salt concerned. It is usually preferred to utilize a concentration value less than about 1.0 M, and more preferably a value of about 0.10 M to about 0.15 M.

In a batch process, the salt solubilization of the protein is effected at a temperature of from about 1° C. to about 100° C., preferably about 15° C. to about 35° C., preferably accompanied by agitation to decrease the solubilization time, which is usually about 1 to about 60 minutes. It is preferred to effect the solubilization to extract substantially as much protein from the soy protein source as is practicable, so as to provide an overall high product yield.

In a continuous process, the extraction of the soy protein from the soy protein source is carried out in any manner consistent with effecting a continuous extraction of soy protein from the soy protein source. In one embodiment, the soy protein source is continuously mixed with the calcium salt solution and the mixture is conveyed through a pipe or conduit having a length and at a flow rate for a residence time sufficient to effect the desired extraction in accordance with the parameters described herein. In such a continuous procedure, the salt solubilization step is effected rapidly, in a time of up to about 10 minutes, preferably to effect solubilization to extract substantially as much protein from the soy protein source as is practicable. The solubilization in the continuous procedure is effected at temperatures between about 1° C. and about 100° C., preferably between about 15° C. and about 35° C.

The extraction is generally conducted at a pH of about 5 to about 11, preferably about 5 to about 7. The pH of the extraction system (soy protein source and calcium salt solution) may be adjusted, if necessary, to any desired value within the range of about 5 to about 11 for use in the extraction step by the use of any convenient acid, usually hydrochloric acid, or alkali, usually sodium hydroxide, as required.

The concentration of soy protein source in the calcium salt solution during the solubilization step may vary widely. Typical concentration values are about 5 to about 15% w/v.

The protein solution resulting from the extraction step generally has a protein concentration of about 5 to about 50 g/L, preferably about 10 to about 50 g/L.

The protein extraction step with the aqueous salt solution has the additional effect of solubilizing fats which may be present in the soy protein source, which then results in the fats being present in the aqueous phase.

The aqueous calcium salt solution may contain an antioxidant. The antioxidant may be any convenient antioxidant, such as sodium sulfite or ascorbic acid. The quantity of antioxidant employed may vary from about 0.01 to about 1 wt % of the solution, preferably about 0.05 wt %. The antioxidant serves to inhibit the oxidation of any phenolics in the protein solution.

The aqueous phase resulting from the extraction step then may be separated from the residual soy protein source, in any convenient manner, such as by employing a decanter centrifuge, followed by disc centrifugation and/or filtration, to remove residual soy protein source material. The separated residual protein source material may be dried for disposal. Alternatively, the separated residual soy protein source may be processed to recover some residual protein, such as by a conventional isoelectric precipitation procedure or any other convenient procedure to recover such residual protein.

Where the soy protein source contains significant quantities of fat, as described in U.S. Pat. Nos. 5,844,086 and 6,005,076, assigned to the assignee hereof and the disclosures of which are incorporated herein by reference, then the defatting steps described therein may be effected on the separated aqueous protein solution. Alternatively, defatting of the separated aqueous protein solution may be achieved by any other convenient procedure.

The aqueous soy protein solution may be treated with an adsorbent, such as powdered activated carbon or granulated activated carbon, to remove colour and/or odour compounds. Such adsorbent treatment may be carried out under any convenient conditions, generally at the ambient temperature of the separated aqueous protein solution. For powdered activated carbon, an amount of about 0.025% to about 5% w/v, preferably about 0.05% to about 2% w/v, is employed. The adsorbing agent may be removed from the soy solution by any convenient means, such as by filtration.

If of adequate purity, the resulting aqueous soy protein solution may be directly dried to produce a soy protein product. To decrease the impurities content, the aqueous soy protein solution may be processed prior to drying.

The aqueous soy protein solution may be concentrated to increase the protein concentration thereof while maintaining the ionic strength thereof substantially constant. Such concentration generally is effected to provide a concentrated soy protein solution having a protein concentration of about 50 to about 400 g/L, preferably about 100 to about 250 g/L.

The concentration step may be effected in any convenient manner consistent with batch or continuous operation, such as by employing any convenient selective membrane technique, such as ultrafiltration or diafiltration, using membranes, such as hollow-fibre membranes or spiral-wound membranes, with a suitable molecular weight cut-off, such as about 3,000 to about 1,000,000 Daltons, preferably about 5,000 to about 100,000 Daltons, having regard to differing membrane materials and configurations, and, for continuous operation, dimensioned to permit the desired degree of concentration as the aqueous protein solution passes through the membranes.

As is well known, ultrafiltration and similar selective membrane techniques permit low molecular weight species to pass therethrough while preventing higher molecular weight species from so doing. The low molecular weight species include not only the ionic species of the food grade salt but also low molecular weight materials extracted from the source material, such as carbohydrates, pigments, low molecular weight proteins and anti-nutritional factors, such as trypsin inhibitors, which are themselves low molecular weight proteins. The molecular weight cut-off of the membrane is usually chosen to ensure retention of a significant proportion of the protein in the solution, while permitting contaminants to pass through having regard to the different membrane materials and configurations.

The concentrated soy protein solution then may be subjected to a diafiltration step, before or after complete concentration, using calcium salt solution, such as a solution of calcium chloride at the same pH and the same concentration of calcium salt as the extraction solution. If a reduction in the salt content of the retentate is desired, the diafiltration solution employed may be an aqueous calcium salt solution at the same pH but lower salt concentration than the extraction solution. However, the salt concentration of the diafiltration solution must be chosen so that the salt level in the retentate remains sufficiently high to maintain the desired protein solubility. As mentioned, the diafiltration solution is preferably at a pH equal to that of the protein solution being diafiltered. The pH of the diafiltration solution may be adjusted with any convenient acid, such as hydrochloric acid or phosphoric acid or alkali, such as sodium hydroxide. Such diafiltration may be effected using from about 2 to about 40 volumes of diafiltration solution, preferably about 5 to about 25 volumes of diafiltration solution. In the diafiltration operation, further quantities of contaminants are removed from the aqueous soy protein solution by passage through the membrane with the permeate. The diafiltration operation may be effected until no significant further quantities of contaminants or visible colour are present in the permeate or until the retentate has been sufficiently purified so as, when dried, to provide a soy protein product with the desired protein content, preferably an isolate with a protein content of at least about 90 wt % on a dry weight basis. Such diafiltration may be effected using the same membrane as for the concentration step. However, if desired, the diafiltration step may be effected using a separate membrane with a different molecular weight cut-off, such as a membrane having a molecular weight cut-off in the range of about 3,000 to about 1,000,000 Daltons, preferably about 5,000 to about 100,000 Daltons, having regard to different membrane materials and configuration.

The concentration step and the diafiltration step may be effected herein in such a manner that the soy protein product subsequently recovered by drying the concentrated and diafiltered retentate contains less than about 90 wt % protein (N×6.25) d.b., such as at least about 60 wt % protein (N×6.25) d.b. By partially concentrating and/or partially diafiltering the aqueous soy protein solution, it is possible to only partially remove contaminants. This protein solution may then be dried to provide a soy protein product with lower levels of purity. The soy protein product is still able to produce clear protein solutions under acidic conditions.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the concentrated soy protein solution.

The concentration step and the diafiltration step may be effected at any convenient temperature, generally about 2° to about 60° C., preferably about 20° to about 35° C., and for the period of time to effect the desired degree of concentration and diafiltration. The temperature and other conditions used to some degree depend upon the membrane equipment used to effect the membrane processing, the desired protein concentration of the solution and the efficiency of the removal of contaminants to the permeate.

There are two main trypsin inhibitors in soy, namely the Kunitz inhibitor, which is a heat-labile molecule with a molecular weight of approximately 21,000 Daltons, and the Bowman-Birk inhibitor, a more heat-stable molecule with a molecular weight of about 8,000 Daltons. The level of trypsin inhibitor activity in the final soy protein product can be controlled by manipulation of various process variables.

For example, the concentration and/or diafiltration steps may be operated in a manner favorable for removal of trypsin inhibitors in the permeate along with the other contaminants. Removal of the trypsin inhibitors is promoted by using a membrane of larger pore size, such as about 30,000 to about 1,000,000 Daltons, operating the membrane at elevated temperatures, such as about 30° C. to about 60° C. and employing greater volumes of diafiltration medium, such as about 20 to about 40 volumes.

Further, a reduction in trypsin inhibitor activity may be achieved by exposing soy materials to reducing agents that disrupt or rearrange the disulfide bonds of the inhibitors. Suitable reducing agents include sodium sulfite, cysteine and N-acetylcysteine.

The addition of such reducing agents may be effected at various stages of the overall process. The reducing agent may be added with the soy protein source material in the extraction step, may be added to the clarified aqueous soy protein solution following removal of residual soy protein source material, may be added to the concentrated protein solution before or after diafiltration or may be dry blended with the dried soy protein product. The addition of the reducing agent may be combined with the membrane processing steps, as described above.

If it is desired to retain active trypsin inhibitors in the concentrated protein solution, this can be achieved by utilizing a concentration and diafiltration membrane with a smaller pore size, operating the membrane at lower temperatures, employing fewer volumes of diafiltration medium and not employing a reducing agent.

The concentrated and optionally diafiltered protein solution may be subject to a further defatting operation, if required, as described in U.S. Pat. Nos. 5,844,086 and 6,005,076. Alternatively, defatting of the concentrated and optionally diafiltered protein solution may be achieved by any other convenient procedure.

The concentrated and optionally diafiltered aqueous protein solution may be treated with an adsorbent, such as powdered activated carbon or granulated activated carbon, to remove colour and/or odour compounds. Such adsorbent treatment may be carried out under any convenient conditions, generally at the ambient temperature of the concentrated aqueous protein solution. For powdered activated carbon, an amount of about 0.025% to about 5% w/v, preferably about 0.05% to about 2% w/v, is employed. The adsorbent may be removed from the soy protein solution by any convenient means, such as by filtration.

The concentrated and optionally diafiltered soy protein solution resulting from the optional defatting and optional adsorbent treatment step may be subjected to a pasteurization step to reduce the microbial load. Such pasteurization may be effected under any desired pasteurization conditions. Generally, the concentrated and optionally diafiltered soy protein solution is heated to a temperature of about 55° to about 70° C., preferably about 60° to about 65° C., for about 30 seconds to about 60 minutes, preferably about 10 to about 15 minutes. The pasteurized concentrated soy protein solution then may be cooled for drying or further processing, preferably to a temperature of about 15° to about 35° C.

In accordance with one aspect of the current invention, the concentrated and optionally diafiltered clear aqueous soy protein solution may be dried by any convenient technique, such as spray drying or freeze drying to yield the soy protein product. Alternatively, the concentrated and optionally diafiltered soy protein solution may be adjusted in pH to about 2.0 to about 4.0. The pH adjustment may be effected in any convenient manner, such as by the addition of hydrochloric acid or phosphoric acid. The resulting acidified soy protein solution then is dried. As a further alternative, the pH adjusted soy protein solution may be subjected to a heat treatment to inactivate heat labile anti-nutritional factors, such as the trypsin inhibitors mentioned above. Such a heating step also provides the additional benefit of reducing the microbial load. Generally, the protein solution is heated to a temperature of about 70° to about 120° C., preferably about 85° to about 95° C., for about 10 seconds to about 60 minutes, preferably about 30 seconds to about 5 minutes. The heat treated acidified soy protein solution then may be cooled to a temperature of about 2° C. to about 60° C., preferably about 20° to about 35° C. The resulting acidified, heat treated soy protein solution then is dried.

In another aspect of the invention, the concentrated protein solution resulting from the concentration step and optional diafiltration step, optional defatting step, optional adsorbent treatment step and optional pasteurization step, is diluted to effect precipitate formation by mixing the concentrated protein solution with water having the volume required to achieve the degree of dilution desired. When the precipitated protein is to be separated from the residual aqueous phase, termed the supernatant, as is the case for this aspect of the current invention, the degree of dilution is generally about 5 fold to about 25 fold, preferably about 10 fold to about 20 fold. The water with which the concentrated protein solution is mixed preferably has a temperature of about 1° to about 60° C., preferably about 15° to about 35° C.

In a batch operation, the batch of concentrated protein solution is added to a static body of water having the desired volume, as discussed above. The dilution of the concentrated protein solution and consequential decrease in ionic strength causes the formation of the protein precipitate. In the batch procedure, the protein precipitate is allowed to settle in the body of water. The settling may be assisted, such as by centrifugation. Such induced settling decreases the moisture content and the occluded salt content of the precipitated protein.

Alternatively, the dilution operation may be carried out continuously by continuously passing the concentrated protein solution to one inlet of a T-shaped pipe, while the diluting water is fed to the other inlet of the T-shaped pipe, permitting mixing in the pipe. The diluting water is fed into the T-shaped pipe at a rate sufficient to achieve the desired degree of dilution of the concentrated protein solution.

The mixing of the concentrated protein solution and the diluting water in the pipe initiates the formation of protein precipitate and the mixture is continuously fed from the outlet of the T-shaped pipe into a settling vessel, from which, when full, supernatant is permitted to overflow. The mixture preferably is fed into the body of liquid in the settling vessel in a manner which minimizes turbulence within the body of liquid.

In the continuous procedure, the protein precipitate is allowed to settle in the settling vessel and the procedure is continued until a desired quantity of the precipitate has accumulated in the bottom of the settling vessel, whereupon the accumulated precipitate is removed from the settling vessel. In lieu of settling by sedimentation, the precipitate may be separated continuously by centrifugation.

By the utilization of a continuous process for the recovery of soy protein precipitate as compared to the batch process, the initial protein extraction step can be significantly reduced in time for the same level of protein extraction. In addition, in a continuous operation, there is less chance of contamination than in a batch procedure, leading to higher product quality and the process can be carried out in more compact equipment.

The settled precipitate is separated from the residual aqueous phase or supernatant, such as by decantation of the residual aqueous phase from the settled mass or by centrifugation. The precipitate may be washed to remove residual supernatant, such as with about 1 to about 10, preferably about 2 to about 3 volumes of water and then the precipitate recovered again, as above. The optionally washed precipitate may be used in the wet form or may be dried, by any convenient technique, such as spray drying or freeze drying, to a dry form. The dry precipitate has a high protein content, in excess of about 60 wt % protein, preferably at least about 90 wt % protein (N×6.25), and more preferably at least about 100 wt % (N×6.25). The dry precipitate is low in phytic acid content, generally less than about 1.5% by weight.

The supernatant arising from the dilution step may be discarded or, if of sufficient purity, dried to produce a soy protein product. To decrease the impurities content, the supernatant may be processed, with acidification, such as to pH about 1.5 to about 4.4, preferably about 2.0 to about 4.0, or without acidification and dried by any convenient means to yield one or more soy protein products. The supernatant stream is enriched in trypsin inhibitors due to the fractionation occurring on dilution. The supernatant may be processed to yield a dry protein product high in trypsin inhibitor activity or the process steps may be geared to reduce the trypsin inhibitor activity of the protein derived from this stream. If processed without acidification, heat treatment of the supernatant before or after concentration may be employed to precipitate a fraction of heat sensitive proteins, while the trypsin inhibitors stay largely in solution. Alternatively, the supernatant may be concentrated at low pH and then the sample adjusted in pH to about 6 to about 7, using any convenient alkali, such as sodium hydroxide, prior to the application of the heat treatment to precipitate the heat sensitive proteins. Such a heat treatment may be effected at a temperature of about 70° C. to about 120° C., preferably about 75° C. to about 105° C. for about 1 minute to about 30 minutes, preferably about 5 minutes to about 15 minutes. The heat precipitated proteins may be removed in any convenient manner, such as centrifugation or filtration or a combination thereof. The precipitate then may be washed with about 1 to about 10, preferably about 2 volumes of water to remove entrapped supernatant, then recovered as above and dried by any convenient means to provide a soy protein product with a reduced trypsin inhibitor content.

Heat treatment of the acidified supernatant may be used to inactivate heat-labile trypsin inhibitors. Partially concentrated or fully concentrated acidified soy protein solution may also be heat treated to inactivate heat labile trypsin inhibitors. Generally, the protein solution is heated to a temperature of about 70° to about 120° C., preferably about 85° to about 95° C., for about 10 seconds to about 60 minutes, preferably about 30 seconds to about 5 minutes. The heat treated acidified soy protein solution then may be cooled to a temperature of about 2° C. to about 60° C., preferably about 20° to about 35° C. for further processing.

The supernatant or the acidified and optionally heat treated supernatant or the centrate resulting from the removal of proteins deposited by heat treatment of the supernatant, which may optionally be acidified after the removal of the precipitated protein, such as to pH about 1.5 to about 4.4, preferably about 2.0 to about 4.0, may be concentrated to increase the protein concentration thereof. Such concentration is effected using any convenient selective membrane technique, such as ultrafiltration or diafiltration, using membranes with a suitable molecular weight cut-off permitting low molecular weight species, including salt, carbohydrates, pigments, trypsin inhibitors and other low molecular weight materials extracted from the protein source material, to pass through the membrane, while retaining a significant proportion of the soy protein in the solution. Ultrafiltration membranes having a molecular weight cut-off of about 3,000 to 1,000,000 Daltons, preferably about 5,000 to about 100,000 Daltons, having regard to differing membrane materials and configuration, may be used. Concentration of the protein solution in this way also reduces the volume of liquid required to be dried to recover the protein. The protein solution generally is concentrated to a protein concentration of about 50 g/L to about 400 g/L, preferably about 100 to about 250 g/L, prior to drying. Such concentration operation may be carried out in a batch mode or in a continuous operation, as described above.

The soy protein solution may be subjected to a diafiltration step, before or after complete concentration, using water or a dilute salt solution. The water or dilute salt solution may be at its natural pH or at a pH equal to that of the protein solution being diafiltered or at any pH value in between. Such diafiltration may be effected using from about 2 to about 40 volumes of diafiltration solution, preferably about 5 to about 25 volumes of diafiltration solution. In the diafiltration operation, further quantities of contaminants are removed from the clear aqueous soy protein solution by passage through the membrane with the permeate. The diafiltration operation may be effected until no significant further quantities of contaminants or visible colour are present in the permeate or until the protein solution has been sufficiently purified so as, when dried, to provide a soy protein product with the desired protein content, preferably an isolate with a protein content of at least 90 wt % (N×6.25) d.b. Such diafiltration may be effected using the same membrane as for the concentration step. However, if desired, the diafiltration step may be effected using a separate membrane with a different molecular weight cut-off, such as a membrane having a molecular weight cut-off in the range of about 3,000 to about 1,000,000 Daltons, preferably about 5,000 to about 100,000 Daltons, having regard to different membrane materials and configuration.

The concentration step and the diafiltration step may be effected herein in such a manner that the soy protein product subsequently recovered by drying the concentrated and diafiltered retentate contains less than about 90 wt % protein (N×6.25) d.b., such as at least about 60 wt % protein (N×6.25) d.b. By partially concentrating and/or partially diafiltering the aqueous soy protein solution, it is possible to only partially remove contaminants. This protein solution may then be dried to provide a soy protein product with lower levels of purity.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the concentrated soy protein solution.

The concentration step and the optional diafiltration step may be effected at any convenient temperature, generally about 2° C. to about 60° C., preferably about 20° C. to about 35° C., and for the period of time to effect the desired degree of concentration and diafiltration. The temperature and other conditions used to some degree depend upon the membrane equipment used to effect the membrane processing, the desired protein concentration of the solution and the efficiency of the removal of contaminants to the permeate.

The concentration and/or diafiltration steps may be operated in a manner favorable for removal of trypsin inhibitors in the permeate along with the other contaminants. Removal of the trypsin inhibitors is promoted by using a membrane of larger pore size, such as 30,000 to 1,000,000 Daltons, operating the membrane at elevated temperatures, such as 30 to 60° C. and employing greater volumes of diafiltration medium, such as 20 to 40 volumes.

Acidifying and membrane processing the protein solution at a lower pH (1.5 to 3) may also reduce the trypsin inhibitor activity relative to processing the solution at a higher pH (3 to 4.4) or without acidification. When the protein solution is concentrated and diafiltered at the low end of the pH range, it may be desired to raise the pH of the retentate prior to drying. The pH of the concentrated and diafiltered protein solution may be raised to the desired value, for example pH 3, by the addition of any convenient food grade alkali such as sodium hydroxide.

Further, a reduction in trypsin inhibitor activity may be achieved by exposing soy materials to reducing agents that disrupt or rearrange the disulfide bonds of the inhibitors. Suitable reducing agents include sodium sulfite, cysteine and N-acetylcysteine.

The addition of such reducing agents may be effected at various stages of the overall process. The reducing agent may be added to the supernatant or the centrate arising from a heat precipitation step, may be added to the concentrated solution before or after diafiltration or may be dry blended with the dried soy protein product. The addition of the reducing agent may be combined with a heat treatment step and the membrane processing steps, as described above.

If it is desired to retain active trypsin inhibitors in the concentrated protein solution, this can be achieved by eliminating or reducing the intensity of the heat treatment step, not utilizing reducing agents, operating the concentration and diafiltration steps at higher pH values, utilizing a concentration and diafiltration membrane with a smaller pore size, operating the membrane at lower temperatures and employing fewer volumes of diafiltration medium.

The concentrated and optionally diafiltered aqueous protein solution may be treated with an adsorbent, such as powdered activated carbon or granulated activated carbon, to remove colour and/or odour compounds. Such adsorbent treatment may be carried out under any convenient conditions, generally at the ambient temperature of the protein solution. For powdered activated carbon, an amount of about 0.025% to about 5% w/v, preferably about 0.05% to about 2% w/v, is employed. The adsorbent may be removed from the soy protein solution by any convenient means, such as by filtration.

The concentrated and optionally diafiltered aqueous soy protein solution then may be dried by any convenient technique, such as spray drying or freeze drying. The dry soy protein product has a protein content of at least about 60 wt % (N×6.25) d.b., preferably in excess of about 90 wt % (N×6.25) d.b., more preferably at least about 100 wt % (N×6.25), d.b. The soy protein product is low in phytic acid content, generally less than about 1.5% by weight.

As mentioned above, the settled protein precipitate formed in the dilution step may be directly dried to yield the protein product. Alternatively, the wet protein precipitate may be re-suspended in water, such as about 2 to about 3 volumes, and re-solubilized by adjusting the pH of the sample to about 1.5 to about 4.4, preferably about 2.0 to about 4.0, using any convenient acid, such as hydrochloric acid or phosphoric acid. The clear protein solution then may be dried by any convenient technique, such as spray drying or freeze drying to a dry form. The dry protein product has a protein content in excess of about 60 wt % protein, preferably at least about 90 wt % protein, more preferably at least about 100 wt % protein (N×6.25).

As a further alternative, the clear, acidified, re-solubilized soy protein solution may be subjected to a heat treatment to inactivate any remaining heat labile anti-nutritional factors. Such a heating step also provides the additional benefit of reducing the microbial load. Generally, the protein solution is heated to a temperature of about 70° to about 120° C., preferably about 85° to about 95° C., for about 10 seconds to about 60 minutes, preferably about 30 seconds to about 5 minutes. The heat treated, acidified soy protein solution then may be cooled for further processing as described below, to a temperature of about 2° to about 60° C., preferably about 20° to about 35° C.

The acidified and optionally heat treated clear solution, may be concentrated to increase the protein concentration thereof. Such concentration is effected using any convenient selective membrane technique, such as ultrafiltration or diafiltration, using membranes with a suitable molecular weight cut-off permitting low molecular weight species, including salt, carbohydrates, pigments, trypsin inhibitors and other low molecular weight materials extracted from the protein source material, to pass through the membrane, while retaining a significant proportion of the soy protein in the solution. Ultrafiltration membranes having a molecular weight cut-off of about 3,000 to 1,000,000 Daltons, preferably about 5,000 to about 100,000 Daltons, having regard to differing membrane materials and configuration, may be used. Concentration of the protein solution in this way also reduces the volume of liquid required to be dried to recover the protein. The protein solution generally is concentrated to a protein concentration of about 50 g/L to about 300 g/L, preferably about 100 to about 200 g/L, prior to drying. Such concentration operation may be carried out in a batch mode or in a continuous operation, as described above.

The soy protein solution may be subjected to a diafiltration step before or after complete concentration using water. The water may be at its natural pH or at a pH equal to that of the protein solution being diafiltered or at any pH value in between. Such diafiltration may be effected using from about 2 to about 40 volumes of diafiltration solution, preferably about 5 to about 25 volumes of diafiltration solution. In the diafiltration operation, further quantities of contaminants are removed from the clear aqueous soy protein solution by passage through the membrane with the permeate. The diafiltration operation may be effected until no significant further quantities of contaminants or visible colour are present in the permeate or until the retentate has been sufficiently purified so as, when dried, to provide a soy protein product with the desired protein content, preferably an isolate with a protein content of at least about 90 wt % (N×6.25) d.b. Such diafiltration may be effected using the same membrane as for the concentration step. However, if desired, the diafiltration step may be effected using a separate membrane with a different molecular weight cut-off, such as a membrane having a molecular weight cut-off in the range of about 3,000 to about 1,000,000 Daltons, preferably about 5,000 to about 100,000 Daltons, having regard to different membrane materials and configuration.

The concentration step and the diafiltration step may be effected herein in such a manner that the soy protein product subsequently recovered by drying the concentrated and diafiltered retentate contains less than about 90 wt % protein (N×6.25) d.b., such as at least about 60 wt % protein (N×6.25) d.b. By partially concentrating and/or partially diafiltering the aqueous soy protein solution, it is possible to only partially remove contaminants. This protein solution may then be dried to provide a soy protein product with lower levels of purity. The soy protein product is still able to produce clear protein solutions under acidic conditions.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the concentrated soy protein solution.

The optional concentration step and the optional diafiltration step may be effected at any convenient temperature, generally about 2° to about 60° C., preferably about 20° to about 35° C., and for the period of time to effect the desired degree of concentration and diafiltration. The temperature and other conditions used to some degree depend upon the membrane equipment used to effect the membrane processing, the desired protein concentration of the solution and the efficiency of the removal of contaminants to the permeate.

As mentioned above, the level of trypsin inhibitor activity in the final soy protein product can be controlled by manipulation of various process variables.

As previously noted, heat treatment of the acidified aqueous soy protein solution may be used to inactivate heat-labile trypsin inhibitors. Partially concentrated or fully concentrated acidified soy protein solution may also be heat treated to inactivate heat labile trypsin inhibitors.

In addition, the concentration and/or diafiltration steps may be operated in a manner favorable for removal of trypsin inhibitors in the permeate along with the other contaminants. Removal of the trypsin inhibitors is promoted by using a membrane of larger pore size, such as 30,000 to 1,000,000 Daltons, operating the membrane at elevated temperatures, such as 30° to 60° C. and employing greater volumes of diafiltration medium, such as 20 to 40 volumes.

Acidifying and membrane processing the protein solution at a lower pH (1.5 to 3) may reduce the trypsin inhibitor activity relative to processing the solution at higher pH (3 to 4.4). When the protein solution is concentrated and diafiltered at the low end of the pH range, it may be desired to raise the pH of the retentate prior to drying. The pH of the concentrated and diafiltered protein solution may be raised to the desired value, for example pH 3, by the addition of any convenient food grade alkali such as sodium hydroxide.

Further, a reduction in trypsin inhibitor activity may be achieved by exposing soy materials to reducing agents that disrupt or rearrange the disulfide bonds of the inhibitors. Suitable reducing agents include sodium sulfite, cysteine and N-acetylcysteine.

The addition of such reducing agents may be effected at various stages of the overall process. The reducing agent may be added to the wet protein precipitate resulting from the dilution step, may be added to the protein solution formed by acidifying and re-solubilizing the precipitate, may be added to the concentrated solution before or after diafiltration or may be dry blended with the dried soy protein product. The addition of the reducing agent may be combined with a heat treatment step and the membrane processing steps, as described above.

If it is desired to retain active trypsin inhibitors in the concentrated protein solution, this can be achieved by eliminating or reducing the intensity of the heat treatment step, not utilizing reducing agents, operating the concentration and diafiltration steps at the higher end of the pH range (3 to 4.4), utilizing a concentration and diafiltration membrane with a smaller pore size, operating the membrane at lower temperatures and employing fewer volumes of diafiltration medium.

The acidified, optionally concentrated and optionally diafiltered clear aqueous protein solution may be treated with an adsorbent, such as powdered activated carbon or granulated activated carbon, to remove colour and/or odour compounds. Such adsorbent treatment may be carried out under any convenient conditions, generally at the ambient temperature of the protein solution. For powdered activated carbon, an amount of about 0.025% to about 5% w/v, preferably about 0.05% to about 2% w/v, is employed. The adsorbent may be removed from the soy protein solution by any convenient means, such as by filtration.

The acidified, optionally concentrated and optionally diafiltered clear aqueous soy protein solution then may be dried by any convenient technique, such as spray drying or freeze drying. The dry soy protein product has a protein content of at least about 60 wt % (N×6.25) d.b., preferably in excess of about 90 wt % (N×6.25) d.b., more preferably at least about 100 wt % (N×6.25) d.b. The soy protein product is low in phytic acid content, generally less than about 1.5% by weight.

In accordance with another aspect of the current invention, the protein precipitated upon dilution into water may be processed together with the supernatant. In such a case, the degree of dilution is generally about 1 to 25 fold, preferably about 3 to about 12 fold. The water with which the concentrated protein solution is mixed has a temperature of about 1° to about 60° C., preferably about 15° C. to about 35° C.

The dilution water, containing the deposited protein precipitate, is adjusted in pH to about 1.5 to about 4.4, preferably about 2.0 to about 4.0, using any convenient acid, such as hydrochloric acid or phosphoric acid. The drop in pH causes the resolubilization of the protein deposited by dilution yielding a clear, acidified protein solution. The protein solution may be used in the wet form or may be dried, by any convenient technique, such as spray drying or freeze drying, to a dry form.

As a further alternative, the protein solution formed by acidifying the mixture of protein precipitate and supernatant may be processed utilizing the same steps as described above for the isolated precipitate resolubilized by acidification.

The optionally concentrated, optionally diafiltered, optionally heat treated, optional adsorbent treated clear aqueous soy protein solution then may be dried by any convenient technique, such as spray drying or freeze drying. The dry soy protein product has a protein content in excess of about 60 wt % protein, preferably at least about 90 wt %, more preferably about 100 wt % (N×6.25) d.b.

The soy protein products produced herein are soluble in an acidic aqueous environment, making the products ideal for incorporation into beverages, both carbonated and uncarbonated, to provide protein fortification thereto. Such beverages have a wide range of acidic pH values, ranging from about 2.5 to about 5. The soy protein products provided herein may be added to such beverages in any convenient quantity to provide protein fortification to such beverages, for example, at least about 5 g of the soy protein per serving. The added soy protein product dissolves in the beverage and does not impair the clarity of the beverage, even after thermal processing.

The soy protein product may be blended with dried beverage prior to reconstitution of the beverage by dissolution in water. In some cases, modification of the normal formulation of the beverage to tolerate the composition of the invention may be necessary where components present in the beverage may adversely affect the ability of the composition to remain dissolved in the beverage.

EXAMPLES

Example 1

This Example illustrates the production of a soy protein isolate that is soluble, transparent and heat stable in acidic solutions and is membrane processed at natural pH. The production of this isolate does not involve a dilution step.

20 kg of defatted, minimally heat processed soy flour was added to 200 L of 0.15 M $CaCl_2$ solution at ambient temperature and agitated for 30 minutes to provide an aqueous protein solution. The residual soy flour was removed and the resulting protein solution was clarified by centrifugation and filtration to produce 169 L of filtered protein solution having a protein content of 1.68% by weight.

The filtered protein extract solution was reduced in volume to 31 L by concentration on a PVDF membrane having a molecular weight cutoff of 5,000 Daltons. The concentrated protein solution was diafiltered with 62 L of 0.075M $CaCl_2$. The resulting diafiltered, concentrated protein solution had a protein content of 13.28% by weight and represented a yield of 95.2 wt % of the initial filtered protein solution. The diafiltered, concentrated protein solution was then dried to yield a product found to have a protein content of 91.45% (N×6.25) d.b. The product was termed S005-L11-08A S702.

A 3.2% w/v protein solution of S702 was prepared in water and the pH lowered to 3 with diluted HCl. The colour and clarity was then assessed using a HunterLab ColorQuest XE instrument operated in transmission mode.

The colour and clarity values are set forth in the following Table 1:

TABLE 1

| HunterLab scores for 3.2% protein solution of S005-L11-08A S702 at pH 3 | | | | |
|---|---|---|---|---|
| sample | L* | a* | b* | haze (%) |
| S702 | 96.51 | −0.82 | 11.45 | 0.8 |

As may be seen from Table 1, the colour of the S702 solution at pH 3 was very light and the haze level was very low.

The colour of the dry powder was also assessed with the HunterLab ColorQuest XE instrument in reflectance mode. The colour values are set forth in the following Table 2:

TABLE 2

| HunterLab scores for S005-L11-08A S702 dry powder | | | |
|---|---|---|---|
| sample | L* | a* | b* |
| S702 | 85.11 | 0.37 | 11.11 |

As may be seen from Table 2, the dry colour of the S702 powder was very light.

The trypsin inhibitor activity of the isolate was determined using the method of Kakade et al. Cereal Chem., 51:376-381 (1974). The S005-L11-08A S702 was found to have a trypsin inhibitor activity of 87 trypsin inhibitor units (TIU)/mg protein (N×6.25).

Example 2

This Example contains an evaluation of the heat stability in water of the soy protein isolate produced by the method of Example 1 (S702).

A 2% w/v protein solution of S005-L11-08A S702 in water was produced and the pH adjusted to 3. The clarity of this solution was assessed by haze measurement with the HunterLab ColorQuest XE instrument. The solution was then heated to 95° C., held at this temperature for 30 seconds and then immediately cooled to room temperature in an ice bath. The clarity of the heat treated solution was then measured again.

The clarity of the protein solution before and after heating is set forth in the following Table 3:

TABLE 3

Effect of heat treatment on clarity of S702 solution

| sample | haze (%) |
| --- | --- |
| before heating | 5.0 |
| after heating | 0.6 |

As can be seen from the data in Table 3, the sample was heat stable. The protein solution was initially very clear and the heat treatment actually reduced the level of haze.

Example 3

This Example contains an evaluation of the solubility in water of the soy protein isolate produced by the method of Example 1 (S702). Solubility was tested based on protein solubility (termed protein method, a modified version of the procedure of Mon et al., J. Food Sci. 50:1715-1718) and total product solubility (termed pellet method).

Sufficient protein powder to supply 0.5 g of protein was weighed into a beaker and then a small amount of reverse osmosis (RO) purified water was added and the mixture stirred until a smooth paste formed. Additional water was then added to bring the volume to approximately 45 ml. The contents of the beaker were then slowly stirred for 60 minutes using a magnetic stirrer. The pH was determined immediately after dispersing the protein and was adjusted to the appropriate level (2, 3, 4, 5, 6 or 7) with diluted NaOH or HCl. A sample was also prepared at natural pH. For the pH adjusted samples, the pH was measured and corrected two times during the 60 minutes stirring. After the 60 minutes of stirring, the samples were made up to 50 ml total volume with RO water, yielding a 1% w/v protein dispersion. The protein content of the dispersions was measured using a Leco FP528 Nitrogen Determinator. Aliquots (20 ml) of the dispersions were then transferred to pre-weighed centrifuge tubes that had been dried overnight in a 100° C. oven then cooled in a desiccator and the tubes capped. The samples were centrifuged at 7800 g for 10 minutes, which sedimented insoluble material and yielded a clear supernatant. The protein content of the supernatant was measured by Leco analysis and then the supernatant and the tube lids were discarded and the pellet material dried overnight in an oven set at 100° C. The next morning the tubes were transferred to a desiccator and allowed to cool. The weight of dry pellet material was recorded. The dry weight of the initial protein powder was calculated by multiplying the weight of powder used by a factor of ((100−moisture content of the powder (%))/100). Solubility of the product was then calculated two different ways:

$$\text{Solubility (protein method) (\%)} = (\% \text{ protein in supernatant}/\% \text{ protein in initial dispersion}) \times 100 \quad 1)$$

$$\text{Solubility (pellet method) (\%)} = (1 - (\text{weight dry insoluble pellet material}/((\text{weight of 20 ml of dispersion/weight of 50 ml of dispersion}) \times \text{initial weight dry protein powder}))) \times 100 \quad 2)$$

The natural pH value of the protein isolate produced in Example 1 in water (1% protein) is shown in Table 4:

TABLE 4

Natural pH of S702 solution prepared in water at 1% protein

| Batch | Product | Natural pH |
| --- | --- | --- |
| S005-L11-08A | S702 | 5.91 |

The solubility results obtained are set forth in the following Tables 5 and 6:

TABLE 5

Solubility of S702 at different pH values based on protein method

| | | Solubility (protein method) (%) | | | | | | |
| --- | --- | --- | --- | --- | --- | --- | --- | --- |
| Batch | Product | pH 2 | pH 3 | pH 4 | pH 5 | pH 6 | pH 7 | Nat. pH |
| S005-L11-08A | S702 | 98.2 | 95.8 | 100 | 94.2 | 15.1 | 11.2 | 10.9 |

TABLE 6

Solubility of S702 at different pH values based on pellet method

| | | Solubility (pellet method) (%) | | | | | | |
| --- | --- | --- | --- | --- | --- | --- | --- | --- |
| Batch | Product | pH 2 | pH 3 | pH 4 | pH 5 | pH 6 | pH 7 | Nat. pH |
| S005-L11-08A | S702 | 98.5 | 100 | 97.3 | 26.6 | 10.2 | 32.0 | 28.3 |

As can be seen from the results of Tables 5 and 6, the S702 products were very soluble in the pH range of 2 to 4.

Example 4

This Example contains an evaluation of the clarity in water of the soy protein isolate produced by the method of Example 1 (S702).

The clarity of the 1% w/v protein solution prepared as described in Example 3 was assessed by measuring the absorbance at 600 nm, with a lower absorbance score indicating greater clarity. Analysis of the samples on a HunterLab ColorQuest XE instrument in transmission mode also provided a percentage haze reading, another measure of clarity.

The clarity results are set forth in the following Tables 7 and 8:

TABLE 7

Clarity of S702 solution at different pH values as assessed by A600

| | | A600 | | | | | | |
|---|---|---|---|---|---|---|---|---|
| Batch | Product | pH 2 | pH 3 | pH 4 | pH 5 | pH 6 | pH 7 | Nat. pH |
| S005-L11-08A | S702 | 0.012 | 0.019 | 0.094 | >3.0 | 2.201 | 2.422 | 2.283 |

TABLE 8

Clarity of S702 solution at different pH values as assessed by HunterLab analysis

| | | HunterLab haze reading (%) | | | | | | |
|---|---|---|---|---|---|---|---|---|
| Batch | Product | pH 2 | pH 3 | pH 4 | pH 5 | pH 6 | pH 7 | Nat. pH |
| S005-L11-08A | S702 | 0.0 | 2.2 | 16.0 | 97.3 | 97.6 | 100.1 | 101.9 |

As can be seen from the results of Tables 8 and 9, solutions of S702 were very clear at pH 2 and 3, but were slightly hazy at pH 4.

Example 5

This Example contains an evaluation of the solubility in a soft drink (Sprite) and a sports drink (Orange Gatorade) of the soy protein isolate produced by the method of Example 1 (S702). The solubility was determined with the protein added to the beverages with no pH correction and again with the pH of the protein fortified beverages adjusted to the level of the original beverages.

When the solubility was assessed with no pH correction, a sufficient amount of protein powder to supply 1 g of protein was weighed into a beaker and a small amount of beverage was added and stirred until a smooth paste formed. Additional beverage was added to bring the volume to 50 ml, and then the solutions were stirred slowly on a magnetic stirrer for 60 minutes to yield a 2% protein w/v dispersion. The protein content of the samples was analyzed using a LECO FP528 Nitrogen Determinator then an aliquot of each of the protein containing beverages was centrifuged at 7800 g for 10 minutes and the protein content of the supernatant measured in each sample.

Solubility (%)=(% protein in supernatant/% protein in initial dispersion)×100

When the solubility was assessed with pH correction, the pH of the soft drink (Sprite) (3.39) and the sports drink (Orange Gatorade) (3.19) without protein was measured. A sufficient amount of protein powder to supply 1 g of protein was weighed into a beaker and a small amount of beverage was added and stirred until a smooth paste formed. Additional beverage was added to bring the volume to approximately 45 ml, and then the solutions were stirred slowly on a magnetic stirrer for 60 minutes. The pH of the protein containing beverages was measured and then adjusted to the original no-protein pH with HCl or NaOH as necessary. The total volume of each solution was then brought to 50 ml with additional beverage, yielding a 2% protein w/v dispersion. The protein content of the samples was analyzed using a LECO FP528 Nitrogen Determinator then an aliquot of the protein containing beverages was centrifuged at 7800 g for 10 minutes and the protein content of the supernatant measured.

Solubility (%)=(% protein in supernatant/% protein in initial dispersion)×100

The results obtained are set forth in the following Table 9:

TABLE 9

Solubility of S702 in Sprite and Orange Gatorade

| | | no pH correction | | pH correction | |
|---|---|---|---|---|---|
| Batch | Product | Solubility (%) in Sprite | Solubility (%) in Orange Gatorade | Solubility (%) in Sprite | Solubility (%) in Orange Gatorade |
| S005-L11-08A | S702 | 100 | 100 | 96.4 | 100 |

As can be seen from the results of Table 9, the S702 protein was extremely soluble in both the Sprite and the Orange Gatorade. Note that the S702 is a neutral pH product but the slightly higher pH of the non-corrected beverage samples did not appear to negatively affect the solubility.

Example 6

This Example contains an evaluation of the clarity in a soft drink and sports drink of the soy protein isolate produced by the method of Example 1 (S702).

The clarity of the 2% w/v protein dispersions prepared in a soft drink (Sprite) and a sports drink (Orange Gatorade) in Example 5 were assessed for clarity using the methods described in Example 4. For the absorbance measurements at 600 nm, the spectrophotometer was blanked with the appropriate beverage before the measurement was performed.

The results obtained are set forth in the following Tables 10 and 11:

TABLE 10

Clarity (A600) of S702 in Sprite and Orange Gatorade

| | | no pH correction | | pH correction | |
|---|---|---|---|---|---|
| Batch | Product | A600 in Sprite | A600 in Orange Gatorade | A600 in Sprite | A600 in Orange Gatorade |
| S005-L11-08A | S702 | 0.209 | 0.520 | 0.158 | 0.204 |

TABLE 11

HunterLab haze readings for S702 in Sprite and Orange Gatorade

| | | no pH correction | | pH correction | |
|---|---|---|---|---|---|
| Batch | Product | haze (%) in Sprite | haze (%) in Orange Gatorade | haze (%) in Sprite | haze (%) in Orange Gatorade |
| no protein | | 0.0 | 44.0 | 0.0 | 44.0 |
| S005-L11-08A | S702 | 35.7 | 80.8 | 32.6 | 65.6 |

As can be seen from the results of Tables 10 and 11, despite the excellent solubility, Sprite and Orange Gatorade samples containing S702 were somewhat hazy. Correcting the pH reduced the haze level only slightly.

Example 7

This Example was conducted to extract the soy protein source with calcium chloride solution at various pH values.

Three samples of defatted, minimally heat processed soy flour (10 g each) were extracted with 0.15M $CaCl_2$ (100 ml) for 30 minutes at room temperature with a magnetic stirrer/stir bar. One sample was extracted at natural pH, one sample was adjusted to pH 2.98 with dilute HCl and the third sample was adjusted to pH 8.55 with dilute NaOH. The pH of the extraction systems was adjusted immediately after wetting the flour. After the extraction, the samples were centrifuged at 10,200 g for 10 minutes to separate extract from the spent meal. The supernatant was then further clarified by filtration through a 0.45 μm pore size syringe filter. Filtrates were analyzed for pH, conductivity, clarity (A600) and protein content (Leco). A sample of filtrate was also diluted 1:1 with an equal volume of RO water and the A600 measured again. Diluted and undiluted filtrate samples were acidified to pH 3 with diluted HCl and the A600 measured again.

The properties of the filtrates obtained are set forth in the following Table 12:

TABLE 12

Properties of initial extracts

| sample | A600 | % protein | Extractability (%) | cond. (mS) |
|---|---|---|---|---|
| natural pH | 0.072 | 3.00 | 55.2 | 22.9 |
| pH 2.98 | 0.109 | 3.88 | 71.5 | 27.9 |
| pH 8.55 | 0.139 | 3.46 | 63.7 | 23.0 |

As may be seen in Table 12, the low pH conditions extracted the highest amount of protein. However, the extractability was quite good at all the pH conditions evaluated.

The clarity of the acidified, full strength extracts is set forth in the following Table 13:

TABLE 13

Effect of acidification on clarity of full strength extracts

| sample | initial pH | final pH | final A600 |
|---|---|---|---|
| natural pH | 5.44 | 2.94 | 0.052 |
| pH 2.98 | 3.10 | 3.10 | 0.109 |
| pH 8.55 | 8.18 | 2.78 | 0.140 |

As can be seen from Table 13, upon acidification, all of the extracts were quite clear, but the sample extracted at natural pH was the clearest.

The clarity of the acidified, diluted extracts is set forth in the following Table 14:

TABLE 14

Effect of acidification on clarity of diluted extracts

| sample | initial pH | initial A600 | final pH | final A600 |
|---|---|---|---|---|
| natural pH | 5.53 | 2.582 | 2.93 | 0.046 |
| pH 2.98 | 3.22 | 0.056 | 2.81 | 0.050 |
| pH 8.55 | 8.14 | 2.756 | 3.05 | 0.112 |

As may be seen from Table 14, when the samples were diluted 1:1 with water and then acidified, all samples again were quite clear. However, the clarity of the samples extracted at natural and acidic pH was better than the sample extracted at high pH.

Example 8

This Example illustrates the production of soy protein isolate that is soluble, transparent and heat stable in acidic solutions and is membrane processed at natural pH then fractionated by a dilution step.

'a' kg of soy 'b' was added to 'c' L of 0.15 M $CaCl_2$ solution at ambient temperature and agitated for 30 minutes to provide an aqueous protein solution. The residual soy protein source was removed and the resulting protein solution was clarified by centrifugation and filtration to produce 'd' L filtered protein solution having a protein content of 'e' % by weight.

'f' L of the protein extract solution was reduced to 'g' on a 'h' membrane having a molecular weight cutoff of T Daltons, producing a concentrated protein solution with a protein content of 'j' % by weight. The concentrated protein solution was then diafiltered with 'k' L of 0.15M $CaCl_2$ solution on the same membrane used for the initial concentration step. The diafiltered protein solution was then further concentrated to 'l' kg on the same membrane used for the initial concentration and diafiltration steps, producing a concentrated protein solution with a protein content of 'm' wt %.

'n' kg of the concentrated or concentrated and diafiltered protein solution at 'o' ° C. was then diluted 'p' into reverse osmosis (RO) purified water having a temperature of 'q' ° C. A white cloud formed immediately and was allowed to settle. The supernatant was removed by centrifugation and the precipitated protein was recovered in a yield of 'r' wt % of the filtered protein solution. The recovered 's' kg of protein precipitate was then washed with about T volumes of water and the water decanted. 'u' of the washed precipitate was then resolubilized in about 'v' volumes of water with sufficient diluted hydrochloric acid added to adjust the sample pH to 'w'. An additional 'x' kg of pH 3 RO water was added to thin the re-solubilized precipitate to facilitate spray drying. 'y' kg of the re-solubilized precipitate was then spray dried. The dried protein was found to have a protein content of 'z'% (N×6.25) d.b. The product was given the designation 'aa' S7300. Another 'ab' kg of the re-solubilized precipitate fraction was heated to 90° C. for 1 minute and then diluted with about 'ac' L of RO water to facilitate spray drying. The dried protein was found to have a protein content of 'ad'% (N×6.25) d.b. The product was given a designation 'aa' S7300H. The other 'ae' of the washed precipitate was resolubilized in about 'af' volumes of water with sufficient diluted phosphoric acid added to adjust the sample pH to 'ag'. 'ah' kg of the re-solubilized precipitate fraction was then spray dried. The dried protein was found to have a protein content of 'ai' % (N×6.25) d.b. The product was given a designation 'aa' S7300-02. The parameters 'a' to 'ai' are shown in the following Table 15.

TABLE 15

Parameters for runs to produce S7300 products

| aa | S005-C19-09A | S013-J06-09A | S013-J27-09A | S013/15-K30-09A |
|---|---|---|---|---|
| a | 20 | 50 | 40 | 40 |
| b | flour (defatted, minimally heat processed) | white flake | white flake | white flake |
| c | 200 | 500 | 400 | 400 |
| d | 172.9 | 276.4 | 325 | 330 |
| e | 2.25 | 2.47 | 2.44 | 2.38 |
| f | 172.9 | 275 | 325 | 330 |
| g | 19.7 kg | 25.48 kg | 22 kg | 67 L |
| h | PES | PES | PES | PES |
| i | 100,000 | 100,000 | 100,000 | 100,000 |
| j | 16.36 | 22.06 | not determined | 9.74 |
| k | n/a | n/a | n/a | 335 |
| l | n/a | n/a | n/a | 23.2 |
| m | n/a | n/a | n/a | 23.7 |
| n | 19.7 | 25 | 22 | 22.7 |
| o | 31.5 | 27 | 25.2 | 30 |
| p | 1:10 | 1:15 | 1:15 | 1:15 |
| q | 2.4 | 17.3 | 14.9 | 13 |
| r | 61.7 | 67.1 | 57.1 | 53.6 |
| s | 5.01 | 8.26 | 9.78 | 10.7 |
| t | 0 | 2 | 2 | 2 |
| u | all | all | half | all |
| v | 1 | 2 | 2 | 1.7 |
| w | 1.97 | 3.20 | 2.81 | 3 |
| x | 8.5 | 0 | 0 | 0 |
| y | 18.5 | 11.36 | 16.2 | 26 |
| z | 98.76 | 101.74 | 100.92 | 100.73 |
| ab | n/a | 12.57 | n/a | n/a |
| ac | n/a | 26 | n/a | n/a |
| ad | n/a | 101.60 | n/a | n/a |
| ae | n/a | n/a | half | n/a |
| af | n/a | n/a | 2 | n/a |
| ag | n/a | n/a | 2.76 | n/a |
| ah | n/a | n/a | 12.4 | n/a |
| ai | n/a | n/a | 94.32 | n/a | n/a = not applicable 3.2% protein solutions of the S7300, S7300H and S7300-02 products were prepared in water and the colour and clarity assessed using a HunterLab ColorQuest XE operated in transmission mode. The pH of the solutions was measured with a pH meter.

The pH, colour and clarity values are set forth in the following Table 16.

TABLE 16 pH and HunterLab scores for 3.2% protein solutions of S7300, S7300H and S7300-02

| batch | sample | pH | L* | a* | b* | haze (%) |
|---|---|---|---|---|---|---|
| S005-C19-09A | S7300 | 2.27 | 97.10 | −1.88 | 11.04 | 0.0 |
| S013-J06-09A | S7300 | 3.01 | 95.08 | −0.67 | 10.08 | 7.4 |
| S013-J06-09A | S7300H | 2.99 | 88.50 | −0.29 | 9.00 | 42.4 |
| S013-J27-09A | S7300 | 2.72 | 92.50 | −0.60 | 10.17 | 29.6 |
| S013-J27-09A | S7300-02 | 2.75 | 91.94 | −0.23 | 9.51 | 36.3 |
| S013/15-K30-09A | S7300 | 2.92 | 95.90 | −0.44 | 8.01 | 10.4 |

As may be seen by the results of Table 16, the pH of the S005-C19-09A product ended up lower than the target pH of 3. This could be remedied by simply adding less acid when re-solubilizing the precipitate. Generally, these products produced lightly coloured solutions with high degrees of transparency. The haze values obtained for the solution of S013-J06-09A S7300H and the solutions of the S013-J27-09A products were surprisingly high. It is thought that the haze present in these samples may have arisen from some difficulty in the spray drying process. The feed streams for these samples entering the spray dryer were quite clear as assessed by A600 measurement (data not shown). When the same 3.2% w/v protein solutions of the S7300 products were evaluated on the HunterLab again, one hour after preparation, the solutions were notably clearer as set forth in the following Table 17.

TABLE 17 pH and HunterLab scores for 3.2% protein solutions of S7300, S7300H and S7300-02 with measurement made one hour after solution preparation

| batch | sample | L* | a* | b* | haze (%) |
|---|---|---|---|---|---|
| S013-J06-09A | S7300H | 93.15 | −0.40 | 9.13 | 22.8 |
| S013-J27-09A | S7300 | 95.27 | −0.80 | 9.62 | 10.0 |
| S013-J27-09A | S7300-02 | 94.63 | −0.46 | 8.95 | 18.1 |

The colour of the dry powders was also assessed with the HunterLab in reflectance mode. The colour values are set forth in the following Table 18.

TABLE 18

HunterLab scores for S7300, S7300H and S7300-02 dry powders

| batch | sample | L* | a* | b* |
|---|---|---|---|---|
| S005-C19-09A | S7300 | 86.43 | −1.91 | 12.70 |
| S013-J06-09A | S7300 | 87.38 | −1.09 | 10.61 |
| S013-J06-09A | S7300H | 88.81 | −0.82 | 8.00 |
| S013-J27-09A | S7300 | 88.11 | −1.04 | 11.97 |
| S013-J27-09A | S7300-02 | 88.09 | −0.73 | 11.31 |
| S013/15-K30-09A | S7300 | 88.17 | −0.70 | 10.19 |

As may be seen from Table 18, the dry products were very light in colour.

The trypsin inhibitor activity of the S7300 products was determined using the method of Kakade et al. Cereal Chem., 51:376-381 (1974). The results obtained are shown in the following Table 19.

TABLE 19

Trypsin Inhibitor Activity (TIA) for S7300, S7300H and S7300-02 in TIU/mg protein (N × 6.25)

| batch | sample | TIA |
|---|---|---|
| S005-C19-09A | S7300 | 49 |
| S013-J06-09A | S7300 | 11.8 |
| S013-J06-09A | S7300H | 3.1 |
| S013-J27-09A | S7300 | 37.7 |
| S013-J27-09A | S7300-02 | 36.6 |
| S013/15-K30-09A | S7300 | 47.5 |

As may be seen from Table 19, the products prepared from the precipitate formed upon dilution of the concentrated protein solution had a lower trypsin activity than was found in Example 1 for a product (S702) prepared similarly, but without the dilution step. The value of washing the precipitate with water before re-solubilizing and drying is unclear based on the variability in the results. A very low TIA was obtained by heat treating the re-solubilized precipitated protein. Comparing the results in Table 19 to the trypsin inhibitor activity values for the supernatants from the same dilution steps illustrates that the dilution does fractionate the precipitated protein away from the trypsin inhibitors. The trypsin inhibitor activities of the supernatants are shown in Table 20.

TABLE 20

Trypsin Inhibitor Activity (TIA) for unprocessed supernatants in TIU/mg protein (N × 6.25)

| batch | TIA |
| --- | --- |
| S005-C19-09A | not determined |
| S013-J06-09A | 294.0 |
| S013-J27-09A | 219.2 |
| S013/15-K30-09A | 272.6 |

As may be seen from Table 20, the TIA of the supernatants was notably higher than the precipitate derived products.

Example 9

This Example illustrates methods of processing the supernatant streams arising from the procedures of Example 8 to form additional soy protein products.

The pH of the supernatant from the dilution step was adjusted from 'a' to 'b' by the addition of diluted HCl. 'c' L of supernatant was then reduced to 'd' kg on a 'e' membrane with a molecular weight cutoff of 'f' Daltons. The concentrated protein solution had a protein concentration of 'g' wt %. With additional protein recovered from the supernatant, the overall recovery of the filtered protein solution was 'h'%. T kg of the concentrated supernatant was spray dried to form a product with a protein content of 'j' (N×6.25) d.b. The product was given the designation 'k' S7200. 'l' kg of the concentrated supernatant was adjusted to pH 'm' with diluted sodium hydroxide solution. 'n' kg of the concentrated supernatant was then heat treated at 85° C. for 10 minutes, which precipitated about 'o' % of the protein associated with the concentrated supernatant. 'p' kg of precipitated protein was recovered by centrifugation and washed with about 'q' volumes of RO water then recovered by centrifugation again. 'r' kg of washed precipitate was freeze dried to form a product with a protein content of 's' % (N×6.25) d.b. This product was designated 'k' S7200P. The centrate containing the protein not precipitated by the heat treatment was filtered and then spray dried to form a product with a protein content of 't' % (N×6.25) d.b. This product was designated 'k' S7200H. Parameters 'a' to 't' are set forth in the following Table 21.

TABLE 21

Parameters for the production of S7200 products from the dilution supernatants prepared as shown in Example 8

| k | S005-C19-09A | S013-J06-09A | S013-J27-09A | S013/15-K30-09A |
| --- | --- | --- | --- | --- |
| a | 6.26 | 5.66 | 5.74 | 5.82 |
| b | 3.16 | n/a | 1.96 | n/a |
| c | 200 | 370 | 355 | 335 |
| d | 5.34 | 19.96 | 20 | 19.74 |
| e | PES | PES | PES | PES |
| f | 10,000 | 100,000 | 100,000 | 100,000 |
| g | 7.32 | 3.34 | 3.77 | 3.30 |
| h | 71.7 | 76.9 | 66.6 | 61.9 |
| i | 5.34 | n/a | n/a | n/a |
| j | 91.66 | n/a | n/a | n/a |
| l | n/a | n/a | 19.3 | n/a |
| m | n/a | n/a | 6.57 | n/a |
| n | n/a | 19.96 | 19.3 | 19.74 |
| o | n/a | 61.2 | 71.6 | 69.2 |
| p | n/a | 2.42 | 3.08 | 2.58 |

TABLE 21-continued

Parameters for the production of S7200 products from the dilution supernatants prepared as shown in Example 8

| k | S005-C19-09A | S013-J06-09A | S013-J27-09A | S013/15-K30-09A |
| --- | --- | --- | --- | --- |
| q | n/a | 0 | 2 | 2 |
| r | n/a | 2.06 | 2.70 | 2.14 |
| s | n/a | 99.78 | 98.06 | 101.61 |
| t | n/a | 81.49 | 70.24 | not determined | n/a = not applicable 3.2% protein solutions of the S7200 and S7200H products were prepared in water and the colour and clarity assessed using a HunterLab ColorQuest XE operated in transmission mode. The pH of the solutions was measured with a pH meter. The S7200P was poorly soluble and so the colour and clarity of this sample was not tested.

The pH, colour and clarity values are set forth in the following Table 22.

TABLE 22 pH and HunterLab scores for 3.2% protein solutions of S7200 and S7200H

| batch | sample | pH | L* | a* | b* | haze (%) |
| --- | --- | --- | --- | --- | --- | --- |
| S005-C19-09A | S7200 | 3.04 | 95.86 | −1.07 | 9.95 | 3.4 |
| S013-J06-09A | S7200H | 5.80 | 95.82 | −1.36 | 11.44 | 42.9 |
| S013-J27-09A | S7200H | 6.24 | 96.18 | −0.93 | 9.82 | 23.9 |
| S013/15-K30-09A | S7200H | | | not determined | | |

As may be seen from Table 22, all the supernatant derived products yielded lightly coloured solutions. However, the S013-J06-09A and S013-J27-09A products were hazier than the S005-C19-09A product. This difference may be attributable to many different factors such as differences in pH, processing and soy protein source. However, the spray drying issues mentioned in Example 8 may have played a role. The centrates arising from the removal of the heat deposited protein from the concentrated supernatant were filtered and quite clear as assessed by A600 measurement prior to the drying step.

The colour of the dry powders was also assessed with the HunterLab in reflectance mode. The colour values are set forth in the following Table 23.

TABLE 23

HunterLab scores for S7200 and S7200H dry powders

| batch | sample | L* | a* | b* |
| --- | --- | --- | --- | --- |
| S005-C19-09A | S7200 | 87.30 | −0.21 | 8.13 |
| S013-J06-09A | S7200H | 86.99 | −0.34 | 8.47 |
| S013-J27-09A | S7200H | 85.97 | −0.22 | 7.20 |
| S013/15-K30-09A | S7200H | | not determined | |

As may be seen from Table 23, the dry products were very light in colour.

The trypsin inhibitor activity of the supernatant derived products was determined using the method of Kakade et al. Cereal Chem., 51:376-381 (1974). The results obtained are shown in the following Table 24.

TABLE 24

Trypsin Inhibitor Activity (TIA) for S7200, S7200P and S7200H in TIU/mg protein (N × 6.25)

| batch | sample | TIA |
|---|---|---|
| S005-C19-09A | S7200 | 482 |
| S013-J06-09A | S7200P | 78.6 |
| S013-J27-09A | S7200P | 8.7 |
| S013/15-K30-09A | S7200P | 40.1 |
| S013-J06-09A | S7200H | 296.7 |
| S013-J27-09A | S7200H | 209.8 |
| S013/15-K30-09A | S7200H | not determined |

As may be seen from Table 24, the S7200P products had notably lower trypsin inhibitor activities than the S7200H products. This suggests that the trypsin inhibitors remain soluble when the concentrated supernatant is fractionated by heat induced precipitation. Lower TIA values for the S7200P were obtained when the protein precipitate was washed with water before drying. The particularly low value obtained for the S013-J27-09A S7200P may also be related to the pH regimen employed in that trial.

Example 10

This Example illustrates the production of soy protein isolate that is soluble, transparent and heat stable in acidic solutions that employs membrane processing at natural pH and a dilution step, but the protein fractions are not separated after dilution.

'a' ml of diafiltered and concentrated retentate from process run S013/S015-K30-09A, prepared as described in Example 8, at approximately 'b' ° C. was diluted with 'c' ml of RO water at approximately 'd'° C. A white cloud formed but when the pH of the sample was lowered to 'e' with diluted HCl the protein re-solubilized. The protein content of the diluted and acidified solution was 'f' wt %. The diluted and acidified protein solution was reduced from a volume of 'g' ml to approximately 'h' g on a T membrane with a molecular weight cutoff of T Daltons, providing a concentrated protein solution with a protein content of 'k' wt %. After removing a small sample of the concentrated protein solution for analysis, 'l' g of the concentrated protein solution was freeze dried to provide 'm' g of a product termed 'n' S7301-01, which had a protein content of 'o' wt % w.b. The remaining 'p' ml of concentrated protein solution was diafiltered with 'q' ml of RO water on the same membrane as used for the concentration step. A total of 'r' g of diafiltered and concentrated protein solution was obtained, having a protein content of 's' wt %. 't' g of this solution was freeze dried to yield 'u' g of a product termed 'n' S7301-02, which had a protein content of 'v'% w.b. Parameters 'a' to 'v' are shown in the following Table 25.

TABLE 25

Parameters for the production of S7301 products

| n | trial 1 | trial 2 |
|---|---|---|
| a | 250 | 120 |
| b | 20 | 24 |
| c | 750 | 1320 |
| d | 22 | 22 |
| e | 3.16 | 3.06 |
| f | 6.35 | 2.27 |
| g | 980 | 1422 |
| h | 492 | 257 |
| i | PES | PES |
| j | 10,000 | 10,000 |
| k | 12.12 | 11.40 |
| l | 218.92 | 114.12 |
| m | 26.86 | 12.03 |
| o | 91.27 | 99.69 |
| p | 250 | 120 |
| q | 1250 | 120 |
| r | 223.42 | 119.70 |
| s | 12.85 | 11.17 |
| t | 198.80 | 105.02 |
| u | 25.83 | 10.78 |
| v | 95.19 | 100.40 |

3.2% protein solutions of the S7301 products were prepared in water and the colour and clarity assessed using a HunterLab ColorQuest XE operated in transmission mode.

The colour and clarity values are set forth in the following Table 26.

TABLE 26

HunterLab scores for 3.2% protein solutions of S7301-01 and S7301-02

| batch | sample | L* | a* | b* | haze (%) |
|---|---|---|---|---|---|
| trial 1 | S7301-01 | 93.67 | −0.21 | 9.93 | 15.7 |
| trial 1 | S7301-02 | 94.13 | −0.01 | 8.74 | 13.4 |
| trial 2 | S7301-01 | 94.76 | −0.19 | 8.41 | 15.9 |
| trial 2 | S7301-02 | 94.78 | −0.13 | 8.36 | 15.5 |

As may be seen from Table 26, all the S7301 solutions had light colour and quite low haze values. The S7301-02 samples, which were diafiltered, were lighter, less green, less yellow and clearer than the S7301-01 samples, which were not diafiltered. This effect of diafiltration was more pronounced in trial 1, where the initial dilution volume was lower and more diafiltration volumes were employed. However, the samples of trial 2, which had a larger dilution volume and only one volume of diafiltration were overall lighter, less yellow and higher in protein content.

Example 11

This Example contains an evaluation of the heat stability in water of the soy protein isolates produced by the methods of Example 8 (S7300) and Example 10 (S7301).

2% w/v protein solutions of S013/15-K30-09A S7300 and trial 1 S7301-02 in water were produced and the pH adjusted to 3 with HCl. The clarity of the solutions was assessed by haze measurement with the HunterLab ColorQuest XE instrument. The solutions were then heated to 95° C., held at this temperature for 30 seconds and then immediately cooled to room temperature in an ice bath. The clarity of the heat treated solutions was then measured again.

The clarity of the protein solutions before and after heating is set forth in the following Table 27:

TABLE 27

Effect of heat treatment on clarity of S7300 and S7301 solutions

| product | haze (%) before heating | haze (%) after heating |
|---|---|---|
| S013/15-K30-09A S7300 | 6.4 | 4.2 |
| trial 1 S7301-02 | 12.0 | 5.2 |

As can be seen from the data in Table 27, the samples were heat stable. The protein solutions were initially quite clear and the heat treatment actually reduced the level of haze

SUMMARY OF THE DISCLOSURE

In summary of this disclosure, the present invention provides an alternative method based on extraction of soy protein from source material using aqueous calcium chloride solution, to obtain a soy protein product which is soluble in acidic media and forms heat stable, transparent solutions therein. Modifications are possible within the scope of this invention.

What we claim is:

1. A method of producing a soy protein product having a soy protein content of at least about 60 wt % (N×6.25), dry weight basis, which comprises:
   (a) extracting a soy protein source with an aqueous calcium salt solution to cause solubilization of soy protein from the protein source and to form an aqueous soy protein solution,
   (b) separating the aqueous soy protein solution from residual soy protein source,
   (c) concentrating the aqueous soy protein solution while maintaining the ionic strength substantially constant by using a selective membrane technique,
   (d) optionally diafiltering the concentrated soy protein solution, and
   (e) drying the concentrated and optionally diafiltered soy protein solution.

2. The method of claim 1 wherein said calcium salt is calcium chloride.

3. The method of claim 2 wherein said calcium chloride solution has a concentration of less than about 1.0 M.

4. The method of claim 3 wherein said calcium chloride solution has a concentration of about 0.10 to about 0.15 M.

5. The method of claim 1 wherein said extraction step is effected at a temperature of about 15° C. to about 35° C.

6. The method of claim 1 wherein said extraction step is carried out at a pH of about 5 to about 11.

7. The method of claim 6 wherein said pH is about 5 to about 7.

8. The method of claim 1 wherein the concentrated and optionally diafiltered soy protein solution is acidified to a pH of about 2.0 to about 4.0 prior to drying.

9. The method of claim 1 wherein said soy protein product has a protein content of about 60 to about 90 wt % (N×6.25) d.b.

10. The method of claim 1 wherein said soy protein product has a protein content of at least about 90 wt % (N×6.25) d.b.

11. The method of claim 1 wherein said soy protein product has a protein content of at least about 100 wt % (N×6.25) d.b.

\* \* \* \* \*